Sept. 4, 1923.  
W. S. DOE  
DRY CELL PRIMARY BATTERY  
Filed Nov. 2, 1920  
1,467,240
Fig. 1.
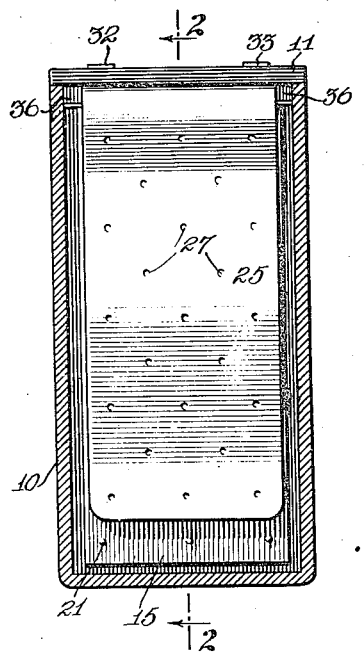
Fig. 2.
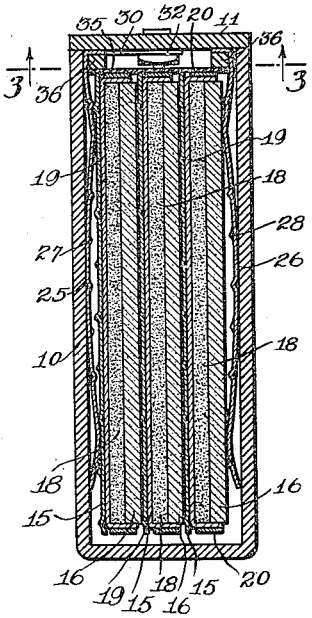
Fig. 4.
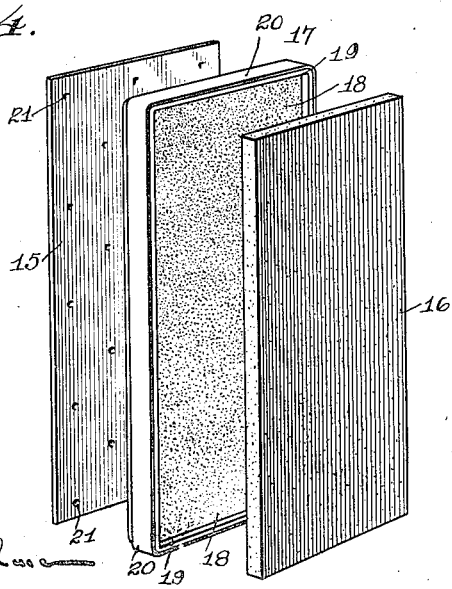
Fig. 3.
WITNESSES
INVENTOR
WALTER SCOTT DOE
BY
ATTORNEYS Patented Sept. 4, 1923.

1,467,240

UNITED STATES PATENT OFFICE.

WALTER SCOTT DOE, OF KENT, OHIO.

DRY-CELL PRIMARY BATTERY.

Application filed November 2, 1920. Serial No. 421,236.

*To all whom it may concern:*

Be it known that I, Walter Scott Doe, a citizen of the United States, and a resident of Kent, in the county of Portage and State of Ohio, have invented a new and Improved Dry-Cell Primary Battery, of which the following is a full, clear, and exact description.

The object of the invention is to provide a new and improved dry-cell primary battery arranged to permit the user to readily replace a used-up cell by a new one with a view to restore the battery to its full power.

Another object is to provide a dry-cell battery having a great voltage and a low internal resistance.

Another object is to permit of readily reviving the batery, in case its energy is run down, by the mere addition of water to one of the dry-cell elements.

Another object is to provide a dry-cell battery that is excedingly serviceable for use in portable hearing devices such as used by deaf people, also for portable self-contained electric lamps or flashlights.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the improved dry-cell battery;

Figure 2 is a cross section of the same on the line 2—2 of Figure 1;

Figure 3 is an inverted sectional plan view of the same on the line 3—3 of Figure 2; and Figure 4 is a perspective view of the members of a single cell in disassembled spaced relation.

The dry-cell primary batery illustrated in the drawings is formed of three cells, but it is expressly understood that I do not limit myself to this number of cells as a single cell, two cells or more than three cells may be used according to the use made of the dry-cell battery and the voltage required for a particular purpose. The dry-cell battery is mounted in a suitably constructed casing 10 made of hard rubber or other insulating material and closed by a removable cover 11. Each of the cells comprises a positive element 15 preferably in the form of a zinc plate, a negative element 16 preferably in the form of a carbon or a graphite plate, and a depolaraizing element 17 interposed between the positive and negative elements 15 and 16. The depolarizing element 17 is in the form of a cake or tablet 18 of a depolarizing material contained in a shallow receptacle or pan 19 of a bibulous or absorbent material, preferably paper chemically treated with an excitant salt, such, for instance, as a solution of sal ammonia (2 lbs.) and bisulphate of mercury (1 oz.) dissolved in a gallon of water. After treating the paper with this solution and drying it, it is formed into the pan 19, the sides and ends of which are dipped into an insulating material such as hot paraffin wax and are then wrapped with an insulating tape 20 to prevent local electric currents from passing from the positive element to the negative element by lateral by-ways. The depolarizing element for forming the cake or tablet 18, preferably consists of powdered carbon (1 lb.), powdered graphite ($\frac{1}{4}$ lb.), manganese dioxide (1 lb.), peroxide of lead ($\frac{1}{4}$ lb.), and a binding material such as liquid glue to form a plastic granular mass which is preferably molded into rectangular shape and of a desired thickness somewhat less than the depth of the receptacle 19 to permit of placing the negative element 16 into the receptacle to contact with the cake or tablet 18 of the depolarizing material. The depolarizing cake or tablet 18 and its container or receptacle 19 are normally dry and inactive, but on the addition of water the excitant salts of the receptacle 19 become active and hence render the depolarizing material of the cake or tablet 18 active to set up or produce a current in conjunction with the positive and negative elements 15 and 16. It is understood that the positive element 15 is in firm contact with the under side of the receptacle 19 and when the latter is wetted an electric current is produced, as above mentioned. In practice, the positive element 15 is preferably provided with struck-up protuberances or tits 21 in contact with the outer face of the negative element 16 of an adjacent cell to insure proper contact between the cells of the battery.

The cells in superposed position, as shown in Figure 2, are held between contact plates 25 and 26 of spring metal, curved to bear against the inner faces of opposite walls of the casing 10 to clamp securely the several superposed cells in position between the contacting plates 25 and 26. The contact plates 25 and 26 are preferably provided with struck-up protuberances or tits 27 and 28 projecting from the inner faces to make firm contact with the positive and negative elements 15 and 16. The contact plates 25 and 26 are provided at their upper ends with angular arms 30 and 31 fastened by binding posts 32 and 33 to the under side of the cover 11. It will be noticed that by the arrangement described the cells are held clamped between the contact plates 25 and 26 and the latter are attached to the cover 11 to permit of conveniently withdrawing the cells from the casing 10 whenever it is desired to do so. A plate 35 of mica or other suitable insulating material is interposed between the top of the several cells and a depending flange 36 on the under side of the cover 11 to prevent short circuiting.

It will be noticed that the dry-cell battery shown and described can be kept inactive or dormant for any length of time prior to use, and when it is desired to use the dry-cell battery then it is only necessary to moisten or wet the depolarizing element 17 with water to cause the excitant salts to become active relative to the depolarizing cake or tablet 18 with a view to set up an electric current in conjunction with the positive and negative elements 15 and 16. The battery can be readily revived, in case its energy is run down, by the mere addition of water to the depolarizing agent 17 of each of the cells.

A battery constructed in the manner shown and described has long life, and in case the positive element 15, that is, the zinc plate, is used up and likewise the depolarizing element 17 then these two elements can be replaced by new ones. It is understood that the negative or carbon element 16 is not liable to be affected by the use of the battery and hence can readily be re-used in conjunction with a new zinc plate and a new depolarizing element 17. It will be noticed that by clamping the cells between the contact members 25 and 26 a desired pressure is had of one cell upon the other to raise or lower the internal resistance of the battery according to the pressure.

Having thus described my invention, I claim as new and desire to secure by Letters Patent:—

1. A dry-cell primary battery, comprising a positive plate-like element, a negative plate-like element, and a depolarizing element interposed between the said positive and negative elements, the said depolarizing element consisting of a receptacle of a bibulous material, and having insulating material applied to its sides and ends, and a cake of depolarizing granular material contained in the said receptacle, the said negative element forming a closure for the said receptacle and being in contact with the depolarizing cake, the said positive element being in contact with the under side of the said receptacle.

2. A dry-cell primary battery, comprising a positive plate-like element, a negative plate-like element and a depolarizing element interposed between the said positive and negative elements, the said depolarizing element consisting of a pan-shaped receptacle of a bibulous material treated to act as an excitant, said receptacle having an insulating material applied to its sides and ends and wrapped with an insulating tape, and an electrolytic granular material in the form of a cake or tablet held in the said receptacle, the said negative element fitting into the said receptacle to close the same and to contact with the said cake, the said positive element engaging the under side of the said receptacle.

3. A dry-cell battery, comprising a casing having a removable cover, curved spring contact plates attached to the said cover and engaging opposite walls of the casing, and a plurality of superposed dry cells interposed and clamped between the said contact plates, each dry cell comprising a zinc element, a carbon element, and a depolarizing element interposed between the zinc and carbon elements.

WALTER SCOTT DOE.